(12) United States Patent
Stemmer et al.

(10) Patent No.: US 10,668,846 B2
(45) Date of Patent: Jun. 2, 2020

(54) ADJUSTMENT DEVICE FOR A MOTOR VEHICLE

(71) Applicant: Adient Luxembourg Holding S.à.r.l., Luxembourg (LU)

(72) Inventors: Jürgen Stemmer, Ramscheid (DE); Tatjana Samojlova, Leichlingen (DE); Dmitrij Gerdt, Köln (DE)

(73) Assignee: Adient Luxembourg Holding S.à.r.l., Luxembourg (LU)

( * ) Notice: Subject to any disclaimer, the term of this patent is extended or adjusted under 35 U.S.C. 154(b) by 0 days.

(21) Appl. No.: 15/512,967

(22) PCT Filed: Sep. 15, 2015

(86) PCT No.: PCT/EP2015/071084
§ 371 (c)(1),
(2) Date: Mar. 21, 2017

(87) PCT Pub. No.: WO2016/046025
PCT Pub. Date: Mar. 31, 2016

(65) Prior Publication Data
US 2017/0291513 A1    Oct. 12, 2017

(30) Foreign Application Priority Data

Sep. 25, 2014   (DE) .................. 10 2014 219 486
Nov. 6, 2014    (DE) .................. 10 2014 222 642

(51) Int. Cl.
*B60N 2/22*     (2006.01)
*B60N 2/90*     (2018.01)
(Continued)

(52) U.S. Cl.
CPC ............. *B60N 2/938* (2018.02); *B60N 2/168* (2013.01); *B60N 2/1685* (2013.01);
(Continued)

(58) Field of Classification Search
CPC ............ G05G 5/005; G05G 5/02; G05G 5/04; G05G 5/28; G05G 5/14; G05G 5/12;
(Continued)

(56) References Cited

U.S. PATENT DOCUMENTS 9,764,666 B2 *   9/2017   Stemmer ................. B60N 2/444

FOREIGN PATENT DOCUMENTS

CN      103 097 183 A        5/2013
DE    10 2012 006059 A1      6/2013
(Continued)

OTHER PUBLICATIONS

Machine Translation of DE 10 2013 015 500, obtained Feb. 2, 2018.*
Machine Translation of WO 2014/057091, obtained Dec. 14, 2018.*

*Primary Examiner* — Richard W. Ridley
*Assistant Examiner* — Brian J McGovern
(74) *Attorney, Agent, or Firm* — McGlew and Tuttle, P.C.

(57) ABSTRACT

An adjustment device includes a housing in which a rotary element is rotatably mounted about a rotational axis, a locking device having a first locking element, connected in a rotationally fixed manner to the rotary element, and a second locking element arranged on the housing and which can be reversibly moved between a primary position in a locked situation, in which the locking elements have a form-and/or force-locking connection, and a secondary position without the connection. An adapter plate is rotates relative to the rotary element and the housing. An unlocking element cooperates with the adapter plate in an actuator region when the second locking element is transferred into the secondary position. The second locking element is shifted by an unlocking height in the unlocking region, and by a lifting height in the actuator region. The actuator region is arranged with the lifting height smaller than the unlocking height.

10 Claims, 3 Drawing Sheets

(51) Int. Cl.
*B60N 2/16* (2006.01)
*B60N 2/225* (2006.01)
*B60N 2/806* (2018.01)
*B60N 2/20* (2006.01)
*B60N 2/66* (2006.01)

(52) U.S. Cl.
CPC ......... *B60N 2/2227* (2013.01); *B60N 2/2258* (2013.01); *B60N 2/20* (2013.01); *B60N 2/66* (2013.01); *B60N 2/806* (2018.02); *B60N 2002/952* (2018.02)

(58) Field of Classification Search
CPC ...... G05G 2505/00; B60N 2/08; B60N 2/442; B60N 2/04; B60N 2/1685; B60N 2/168; B60N 2/1892; B60N 2/123; B60N 2/146; B60N 2/2245; B60N 2/366; B60N 2/4811; B60N 2/4841; B60N 2/444; B60N 2/1889; B60N 2/2227; B60N 2/2254; B60N 2/167; B60N 2/169; B60N 2/1882; B60N 2/1896; B60N 2/224; B60N 2/2258; B60N 2/4445; B60N 2/0875; B60N 2/2218; B60N 2002/446; B60N 2002/4455; B60N 2002/445; B60N 2002/4465; B60N 2002/447; B60N 2002/4475

See application file for complete search history.

(56) References Cited

FOREIGN PATENT DOCUMENTS

| DE | 102013015500 A1 * | 1/2015 | ........... B60N 2/2227 |
|----|-------------------|--------|------------------------|
| EP | 0 857 606 A1 | 12/1998 | |
| WO | 2014/057 091 A1 | 4/2014 | |

* cited by examiner

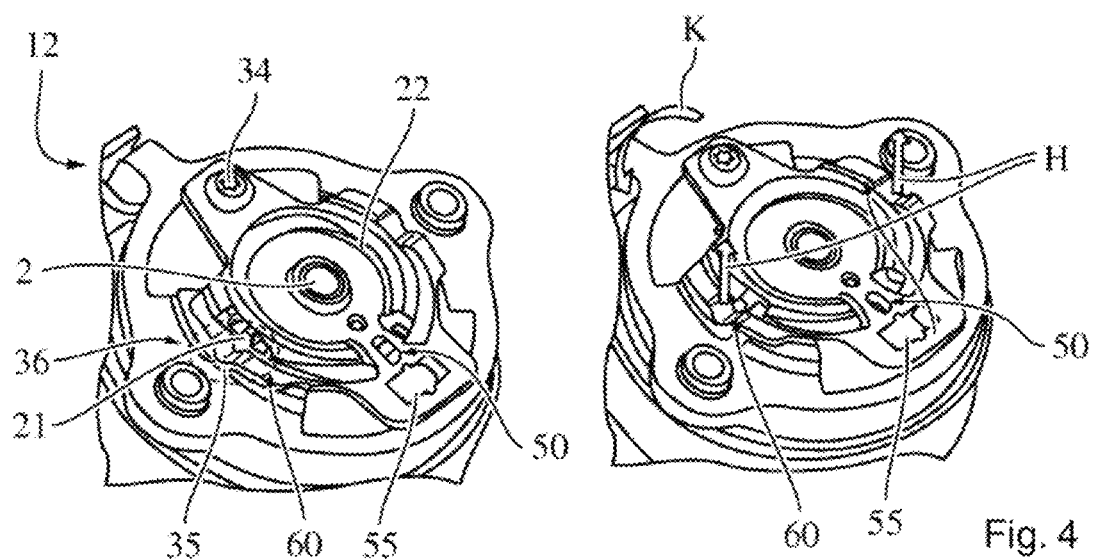
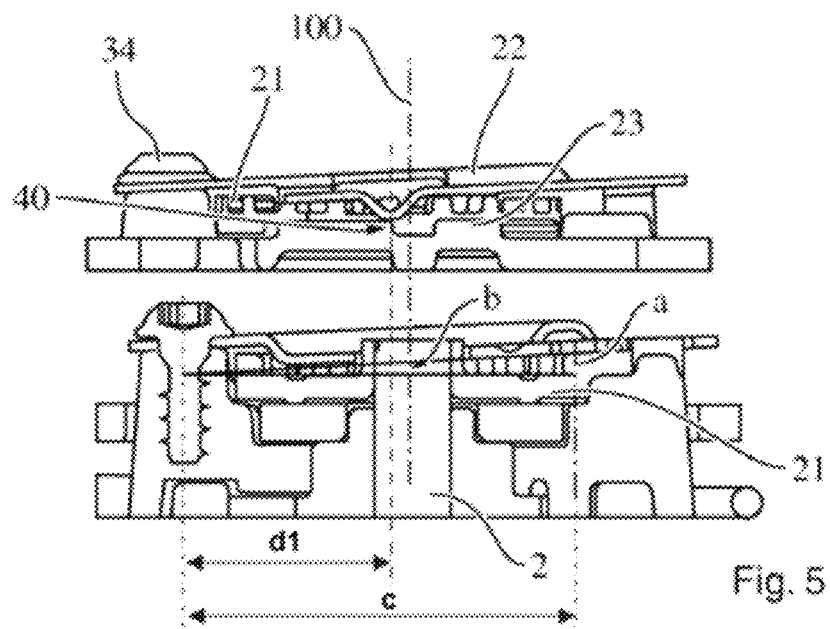

ADJUSTMENT DEVICE FOR A MOTOR VEHICLE

CROSS REFERENCE TO RELATED APPLICATIONS

This application is a United States National Phase Application of International Application PCT/EP2015/071084, filed Sep. 15, 2015, and claims the benefit of priority under 35 U.S.C. § 119 of German Applications 10 2014 219 486.5, filed Sep. 25, 2014, and 10 2014 222 642.2, filed Nov. 6, 2014, the entire contents of which are incorporated herein by reference.

FIELD OF THE INVENTION

The present invention relates to an adjustment device, in particular for a motor vehicle interior equipment component, which is used, for example, for adjusting a vehicle seat and/or one of the components thereof.

BACKGROUND OF THE INVENTION

Such adjustment devices are known from the prior art and in each case have a locking device which ensures that the adjustment device is blocked by a frictional connection between a braking ring and braking elements. The blocking is cancelled only when an adjustment movement is initiated by the user. However, in the event of vibrations, there is the risk of the frictional connection being impaired and therefore of an inadvertent adjustment of the motor vehicle interior equipment component occurring.

For example, document WO 2014/057 091 A1 discloses a motor vehicle interior equipment component with a housing in which a rotary element is provided rotatably about an axis of rotation, wherein a first locking element is provided for rotation with the rotary element, and a second locking element is provided non-rotatably on the housing, said locking elements being reversibly movable relative to each other from a blocking situation, in which the locking elements interact in a form-fitting and/or force-fitting manner with each other, into an adjustment situation in which said form-fitting and/or force-fitting connection is cancelled, and wherein the adjustment device has an adapter plate which is provided rotatably with respect to the rotary element and the housing and at least temporarily drives a locking element.

SUMMARY OF THE INVENTION

An object of the present invention to provide an adjustment device in which the risk of an inadvertent adjustment, in particular due to vibrations, is at least reduced and at the same time simple handling is made possible without changing the original properties, in particular without increasing the idling distance.

The present invention achieves the object by an adjustment device, in particular for a motor vehicle, wherein the adjustment device comprises a housing in which a rotary element is mounted rotatably about an axis of rotation, wherein the adjustment device comprises a locking device with a first locking element and a second locking element, wherein the first locking element is connected to the rotary element for rotation therewith and the second locking element is arranged on the housing, wherein the second locking element is reversibly movable between a primary position in a blocking situation, in which the first locking element and the second locking element interact with each other in an unlocking region by means of a form-fitting and/or force-fitting connection, and a secondary position in an adjustment situation, in which the form-fitting and/or force-fitting connection between the first locking element and the second locking element is cancelled, wherein the adjustment device has an adapter plate, wherein the adapter plate is mounted rotatably relative to the rotary element and to the housing, wherein an unlocking element on the second locking element interacts with the adapter plate in an actuator region during the transfer of the second locking element from the primary position into the secondary position, wherein the second locking element is displaced in the secondary position in relation to the primary position by an unlocking height in the unlocking region, and
by a lifting height in the actuator region,
wherein the actuator region is arranged in such a manner that the lifting height is smaller than the unlocking height.

The adjustment device according to the invention has the advantage over the prior art that the actuator region is placed in such a manner that the required lifting height is reduced and, as a result, a smaller lifting movement is required for reaching a defined unlocking height during the transition from the blocking situation into the adjustment situation than is the case for the configuration of the adjustment devices according to the prior art. As a result, an idling distance or unlocking distance which is required by the adapter plate for unlocking the locking elements in the unlocking region can advantageously be reduced. However, it is also conceivable that the unlocking distance is not intended to be reduced. In this case, the arrangement according to the invention of the actuator region can be used, for example, to increase the unlocking height, as a result of which the first and the second locking element can be configured in such a manner that, for example in the blocking situation, said locking elements engage more deeply in each other and, as a result, the probability of an inadvertent cancelling of the form-fitting and force-fitting connection between the first and the second locking element is reduced.

The adjustment device is preferably part of a motor vehicle interior equipment component, in particular of a fitting of a vehicle seat, with which, for example, an inclination adjustment, for example of a backrest in relation to a seat surface of a motor vehicle seat, is realized. During the transition from the blocking situation into the adjustment situation, the adapter plate here at least temporarily drives the second locking element. During the transfer from the blocking situation into the adjustment situation, the second locking element, in particular the unlocking element, is preferably acted upon with a force by an actuating means of the adapter plate in order to move, in particular to displace, the second locking element along a displacement direction. In particular, the transfer from the blocking situation into the adjustment situation takes place by actuation of the unlocking element and therefore also of the adapter plate. In particular, the second locking element in the secondary position is inclined in relation to the primary position. The second locking element preferably extends centrally over the housing of the adjustment device. The second locking element has, in particular in its center, a recess and/or formation in/on which the rotary element is mounted, and therefore the first locking means and/or the rotary element are/is mounted rotatably while the second locking element remains fixed in position. In particular, the second locking element has a substantially flat extent, wherein the second locking element runs substantially parallel to the adapter plate in the blocking position.

According to a further embodiment of the present invention, it is provided that the second locking element has a fastening means with which the second locking element is fastened to the housing, wherein the actuator region is arranged on the adjustment device in such a manner that a distance between the fastening means and the actuator region is larger than a distance between the fastening means and the unlocking region. In particular, it is provided that a vertical projection of the actuator region onto a connecting line between the fastening means and the unlocking region is substantially arranged between the fastening means and the unlocking region. The second fastening means is preferably screwed, pressed and/or clipped to the housing.

According to a further embodiment of the present invention, it is provided that the second locking element is provided as a metal part, in particular as a sheet metal part. The second locking element is preferably a bent and/or punched sheet metal part. It is particularly preferably manufactured from a spring steel. Very particularly preferably, the second locking element has an extent over the cross section of the entire housing substantially in at least one direction. As a result, the first locking element can be covered in an advantageous manner by the second locking element.

According to a further embodiment of the present invention, it is provided that the second locking element is a spring element which is prestressed in the direction of the adapter plate. The connection between the second locking element and the housing is preferably a snap connection.

According to a further embodiment of the present invention, it is provided that the housing comprises a blocking element, wherein the blocking element restricts the freedom of movement of the second locking element in relation to a rotational movement about an axis running through the fastening means. For example, the blocking element engages for this purpose in a recess in the second locking element. It can thereby advantageously be ensured that the adapter plate, upon interaction with the second locking element, not only displaces the second locking element to the side, but also that the second locking element is raised by the adapter plate in the actuator region along a lifting direction.

According to a further embodiment of the present invention, it is provided that the actuator region is arranged in an encircling edge region of the second locking element. As a result, the actuator region can advantageously be arranged in a common plane next to the first locking element, thus making it possible to realize a particularly compact adjustment device. In particular, it is conceivable that the actuator region is arranged approximately at the level of the axis of rotation along a direction, predetermined by the connecting line, between fastening means and unlocking region. In other words, the actuator region and the axis of rotation preferably lie substantially in a plane which runs perpendicularly to the connecting line between the fastening means and the unlocking region.

According to a further embodiment of the present invention, it is provided that a form-fitting and/or force-fitting connection means is provided on the second locking element in the actuator region, said form-fitting and/or force-fitting connection means interacting in a form-fitting and/or force-fitting manner with the first locking element. Preferably, the first locking element comprises a toothed structure and the second locking element has a recess configured in a complementary manner, wherein the toothed structure engages, for example in the blocking situation, in a multiplicity of recesses and thereby prevents the rotary element from being able to rotate.

The recesses are preferably punched out.

According to a further embodiment of the present invention, it is provided that the unlocking element is configured as a protrusion, bump, projection and/or indentation. In particular, it is provided that the unlocking element engages in a complementary counterpart in the blocking situation. The complementary counterpart is preferably realized by a height profile on the adapter plate. In the blocking situation, the unlocking element of the second locking element is arranged within a trough of the height profile, whereas the unlocking element is arranged on an elevation of said height profile in the adjustment situation.

According to a further embodiment of the present invention, it is provided that the actuating element has a recess in which the unlocking element engages in the blocking situation, and a ramp, wherein the unlocking element is movable along the ramp during the transfer between the blocking situation and the adjustment situation. The ramp preferably forms the transition between the recess, i.e. the trough of the height profile, and the elevation of the height profile. An inclination of the ramp can preferably be adjusted or realized in such a manner that a compromise arises between a small unlocking distance for the adapter plate, on the one hand, and smooth-running actuation of the adapter plate, on the other hand.

According to a further embodiment of the present invention, it is provided that a further actuator region is provided next to the actuator region, wherein a distance between the fastening means and the further actuator region preferably approximately corresponds to the distance between the fastening means and the actuator region. In particular, the locking region and the further actuator region are arranged opposite each other in the encircling edge region of the second locking element. By means of the use of further actuator regions, in which the adapter element acts with force upon the second locking element during the transition from the blocking situation into the adjustment situation, the force which is to be applied for the transition can be distributed in an advantageous manner, in particular uniformly, between a plurality of actuator regions along the second locking element.

According to a further embodiment, the adjustment device furthermore has a further locking device which is movable between the blocking situation and the adjustment situation, wherein the locking device is then provided to move between a locking position for blocking a rotation of the rotary element relative to a braking ring and an unlocking position for releasing rotation of the rotary element relative to the braking ring.

According to a further embodiment, the further locking device is designed in such a manner that, in the blocking situation, a form-fitting and force-fitting connection, in particular a frictional connection, is produced between the braking ring and a braking element, while the first locking device is designed in such a manner that substantially only a form-fitting connection is produced in the locking position. A pure form-fitting connection advantageously permits very good securing in relation to an unintentional adjustment of the rotary element due to vibrations.

According to yet another preferred embodiment, the further locking device has at least one braking element arranged between the braking ring and the rotary element, wherein the locking device is then movable between the locking position for blocking rotation of the rotary element relative to the braking ring and the unlocking position for releasing rotation of the rotary element relative to the braking ring.

The unlocking element is preferably provided for transferring the locking device from the locking position into the unlocking position. In order to adjust the motor vehicle component, the unlocking element therefore merely has to be actuated in order to release both the locking device and the further locking device. Despite the double locking, the comfort for a vehicle occupant is not impaired.

The adjustment device according to the invention is preferably part of a seat height adjustment mechanism, a seat inclination adjustment mechanism, a backrest inclination adjustment mechanism, a lumbar support adjustment mechanism, a headrest adjustment mechanism or the like.

Advantageous refinements and developments of the invention can be gathered from the dependent claims and from the description with reference to the drawings.

The invention furthermore relates to a vehicle seat which comprises an adjustment device according to the invention.

Further details, features and advantages of the invention emerge from the drawings and from the description below of preferred embodiments with reference to the drawings. The drawings here merely illustrate exemplary embodiments of the invention which do not restrict the inventive concept.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 4 is a perspective view showing an adjustment device according to an exemplary embodiment of the present invention both in a blocking situation and an adjustment situation; and FIG. 5 is a sectional side view of the adjustment device according to the exemplary embodiment of the present invention.

DESCRIPTION OF THE PREFERRED EMBODIMENTS

Figure 1:
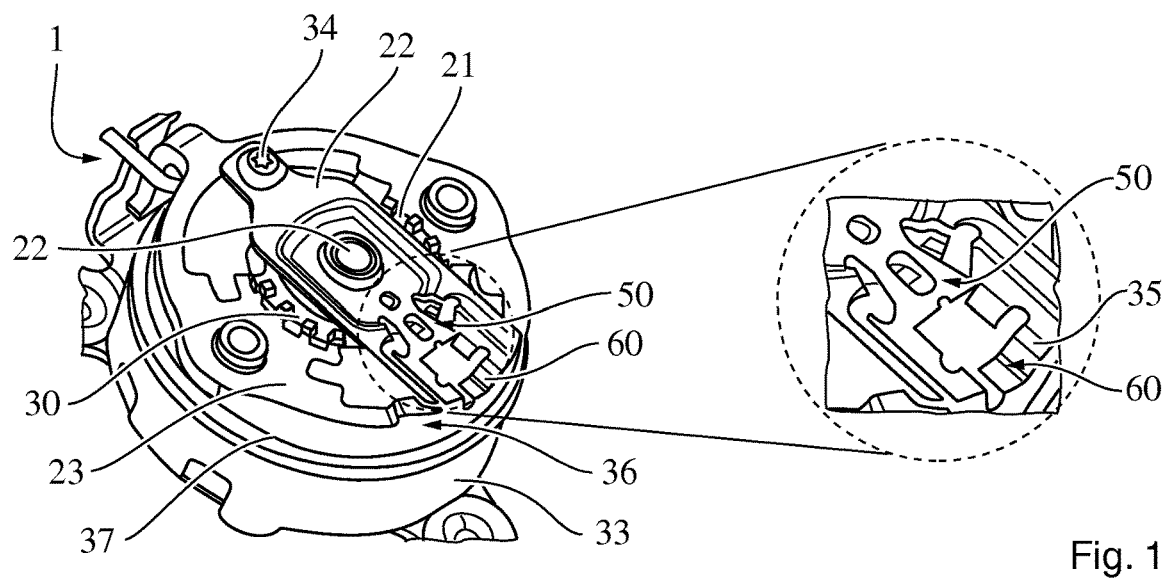
FIG. 1 is a perspective view showing an adjustment device with a first locking element and a second locking element and including an enlarged detail.

Referring to the drawings, in the various figures, identical parts are always provided with the same reference signs and are therefore generally also only named or mentioned once in each case.

Figure 2:
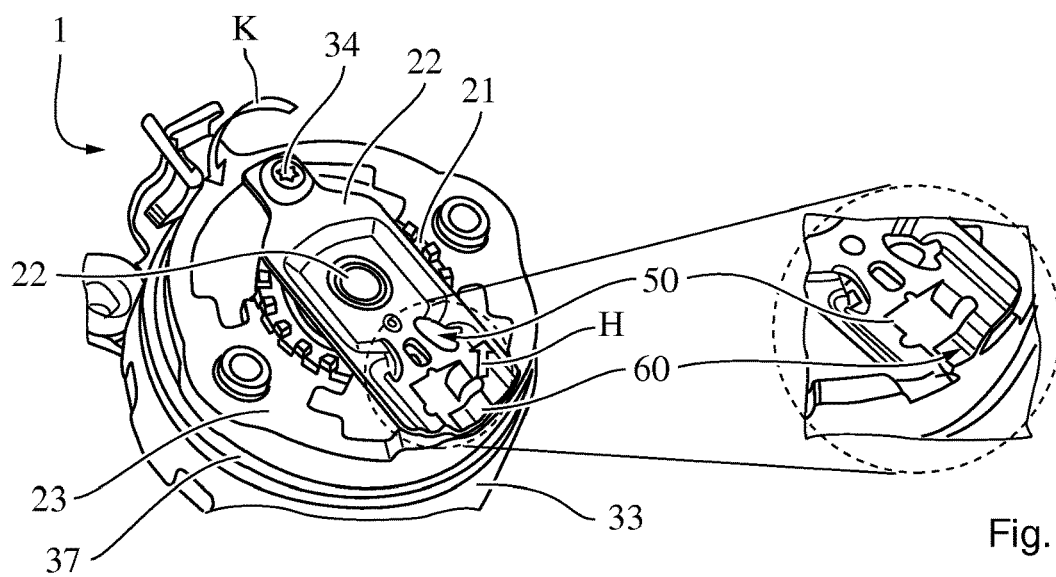
FIG. 2 is a perspective view showing the adjustment device with the first locking element and the second locking element and including an enlarged detail.
Figure 3:
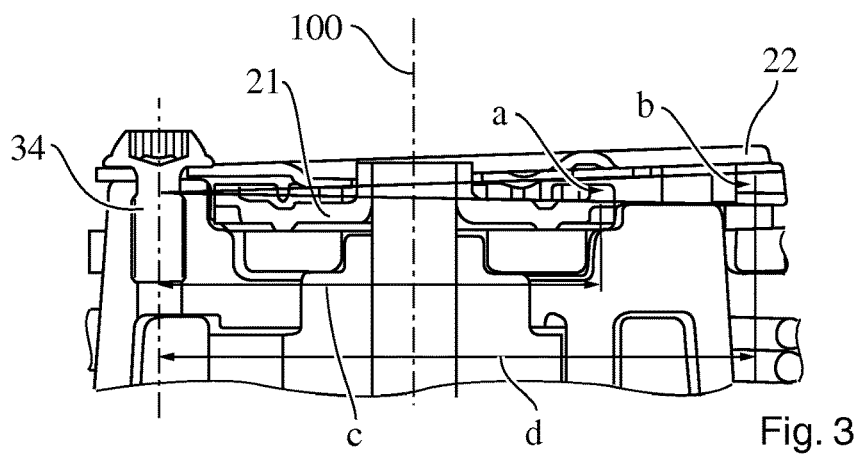
FIG. 3 is a sectional view of the adjustment device with the first locking element and the second locking element and including an enlarged detail.
Figure 6:
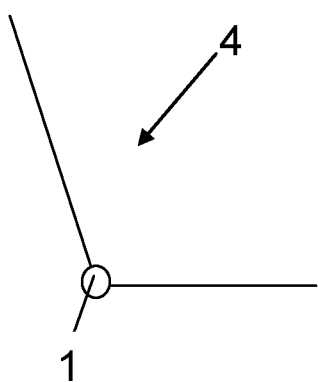

FIGS. 1 to 3 illustrate schematic views of an adjustment device 1 for a motor vehicle component (not illustrated), wherein FIG. 1 shows the adjustment device in a blocking situation and FIG. 2 shows the adjustment device in an adjustment situation. The adjustment device 1 has a locking device which is adjustable between the blocking situation and the adjustment situation. In the blocking situation, rotation of a rotary element 2 about the axis of rotation 100 relative to a housing element 33 is prevented by means of the locking device. The locking device has a first locking element 21 and a second locking element 22. The first locking element 21 is preferably formed as a gearwheel and has a toothed structure 30 on its circumferential edge. The first locking element 21 is connected to the rotary element 2 for rotation therewith. The second locking element 22 is preferably formed as a blocking spring with a general longitudinal extent and has a hole, wherein the second locking element 22 is indirectly connected via the hole to the rotary element 2 so as to be rotatable relative to the rotary element 2. Furthermore, the second locking element 22 has recesses which are complementary with respect to the toothed structure 30 and in which, in the blocking situation, the toothed structure engages in an unlocking region 50 of the adjustment device 1, as can be seen in the enlarged illustration on the right side of FIG. 1. In the blocking situation, the teeth engage in the recesses in such a manner that rotation of the first locking element 21 and therefore of the rotary element 2 is prevented by the form-fitting interaction between the teeth and the recesses along a potential direction of rotation. Furthermore, the second locking element 22 preferably has an unlocking element 35 via which said locking element is connected in a form-fitting and/or force-fitting manner to an actuating means 36, for example a ramp 40, in an actuator region 60 in the blocking situation. The adapter plate 23 preferably comprises the unlocking element 35, wherein the adapter plate 23 is mounted rotatably with respect to the housing and to the first locking element 21. During a transition between the blocking situation and the adjustment situation, the second locking element 22, driven by the adapter plate 23, can be displaced in a lifting direction H parallel to the axis of rotation 100, wherein a corresponding lifting movement brings about a tilting movement K of the second locking element 22, and said tilting movement in turn leads to the form-fitting and/or force-fitting connection between the first locking element 21 and the second locking element 22 being cancelled. In particular, it is provided that the unlocking element 35 and the actuating means 36 are configured in such a manner that the movement of the second locking element 22 in the actuator region 60 leads to a tilting, by means of which the first locking element 21 disengages in the unlocking region 50, and in particular is arranged outside the recesses of the second locking element. The second locking element 22 is preferably designed as a web-shaped blocking spring, wherein the second locking element 22 is fastened via a fastening means 34 to the housing 33 in a fixed position, in particular in a fixed relative position to the adjustment device 1. The second locking element 22 preferably has an unlocking element 35 which is preferably designed as a projection or protrusion. During the transition from the blocking situation into the adjustment situation, the locking element 1 is acted upon with a force by the actuating means 36 by rotation of the adapter plate 23 about the axis of rotation 100. In the embodiment illustrated, the actuator region 60 and the unlocking region 50 lie along a straight line, wherein the unlocking region 50 is arranged between the fastening means 34 and the actuator region 60. The adapter plate 23 is preferably provided in the shape of a disk and has at least the one actuating means 36 and also an additional actuator (not illustrated here). The additional actuator can take on any form known to a person skilled in the art and can be connected to the adapter plate 23 via any connection known to a person skilled in the art. The additional actuator is preferably a lever which is preferably welded to an edge of the adapter plate 23.

Furthermore, it is provided that the rotary element 2 is mounted rotatably about the axis of rotation 100. The adapter plate 23 is mounted rotatably both relative to the housing 33 and to the rotary element 2. The adapter plate 23 is provided in such a manner that, by rotation of the adapter plate 23, the unlocking element 35 is acted upon with force by the actuating means 36 and therefore the second locking element 22 is displaced along the lifting direction H. As a result, the toothed structure 30 disengages and an adjustment of the adjustment device 1 is possible. The second locking element 22 preferably undertakes a tilting movement K here during the transition. The housing 33 preferably has a blocking element 55, and therefore the possible adjustment distance of the second locking element 22 is limited by the corresponding blocking element of the housing 3, and therefore the actuating means 36 does not pass out of contact with the second locking means 22. This advantageously prevents an inadvertent blocking of the adjustment device 1. Very particularly preferably, the housing has a further spring means, in particular a spiral spring, which is provided for returning the adapter plate 23 into its original position.

FIG. 3 illustrates a sectional view of the adjustment device 1 from FIG. 2. It is provided here that the second locking element 22 takes up a blocking position in the blocking situation and a secondary position in the adjustment situation, wherein the secondary position is inclined in relation to the primary position. The second locking element 22 is inclined here in such a manner that the second locking element 22 is raised in the secondary position in relation to the primary position by an unlocking height a in the unlocking region 50 and by a lifting height b in the actuator region 60. In order to achieve the unlocking height a, which is required for cancelling the locking, in the unlocking region 50, a corresponding lifting height b is required in the actuator region 60. In particular, it is provided that the lifting height b is defined by the height of the unlocking element 35 and of the actuating means 36 on the adapter plate 23 on which the second locking element 22 rests in the blocking situation.

FIGS. 4 and 5 illustrate an adjustment device 1 according to a preferred exemplary embodiment of the present invention, wherein FIG. 4 shows the adjustment device 1 in the blocking situation on the left side and in the adjustment situation on the right side. FIG. 5 illustrates, in a side view and a sectional view, the adjustment device 1 in the adjustment situation. The preferred exemplary embodiment of the present invention differs from the adjustment device 1 from FIGS. 1 to 3 by the position of the actuator region 60. It is provided here that a distance d between the fastening means 34 and the actuator region 60 is smaller than a distance c between the fastening means 34 and the unlocking region 50. Under this requirement, the actuator region 60 is arranged in such a manner that, in the blocking position, the lifting height b is smaller than the unlocking height a. It can thereby be brought about that an unlocking distance which has to be covered by the adapter plate 23 for the transfer of the second locking element 22 can be shortened. Finally, the reduction in the lifting height b has the effect that, in order to reach the secondary position, the second locking element 22 has to overcome a lower height in order to realize the unlocking in the unlocking region 50. Alternatively, the configuration with a lifting height which is lower than the unlocking height permits a higher unlocking height to be realized without a lengthening of the unlocking distance of the adapter plate 23 being required.

While specific embodiments of the invention have been shown and described in detail to illustrate the application of the principles of the invention, it will be understood that the invention may be embodied otherwise without departing from such principles.

The invention claimed is:

1. An adjustment device for a motor vehicle, the adjustment device comprising:
a housing in which a shaft is rotatably mounted about an axis of rotation;
a locking device comprising a gearwheel and a spring plate, the gearwheel rotatably coupled to the shaft to rotate therewith and including teeth, the spring plate including a first opening and a protrusion;
wherein the first opening of the spring plate is configured to receive the teeth of the gearwheel therein in order to prevent rotation of the gearwheel and shaft;
the spring plate is attached to the housing at an attachment point;
wherein a distance from the attachment point to the protrusion is less than a distance from the attachment point to the first opening.

2. The adjustment device as claimed in claim 1, wherein the spring plate is attached to the housing by one of a screw and a clip.

3. The adjustment device as claimed in claim 1, wherein the spring plate includes a second opening through which the shaft extends.

4. The adjustment device as claimed in claim 1, further comprising: an adapter plate, the adapter plate is rotatable relative to the housing and the shaft.

5. The adjustment device as claimed in claim 4, wherein the adapter plate comprises a ramped recess.

6. The adjustment device as claimed in claim 5, wherein the spring plate is configured to be movable between a blocking position and a release position, wherein within the blocking position the first opening of the spring plate is configured to receive the teeth of the gearwheel therein in order to prevent rotation of the gearwheel and shaft.

7. The adjustment device as claimed in claim 6, wherein the spring plate is moved from the blocking position to the release position by a rotation of the adapter plate, the rotation of the adapter plate causing the protrusion of the spring plate to move along the ramped recess, the protrusion of the spring plate moving along the ramped recess causing the spring plate to move in a first direction parallel to the axis of rotation such that the teeth of the gearwheel are removed from the first opening which allows the gearwheel and the shaft to be rotated.

8. The adjustment device as claimed in claim 7, wherein the spring plate is prestressed in a second direction parallel to the axis of rotation, the second direction parallel to the axis of rotation being opposite to the first direction parallel to the axis of rotation.

9. The adjustment device as claimed in claim 1, wherein the teeth of the gearwheel are formed on a circumferential edge thereof.

10. The adjustment device as claimed in claim 1, wherein the protrusion of the spring plate is arranged in an encircling edge region of the spring plate.

* * * * *